United States Patent [19]
Takemura et al.

[11] Patent Number: 6,056,502
[45] Date of Patent: *May 2, 2000

[54] REINFORCING FRAME STRUCTURE FOR A TRACTOR

[75] Inventors: Toshihiko Takemura; Toshio Ishiguro, both of Sakai, Japan

[73] Assignee: Kubota Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/615,485

[22] Filed: Mar. 12, 1996

[30] Foreign Application Priority Data

Jul. 7, 1995 [JP] Japan .................................. 7-172404

[51] Int. Cl.[7] .................................................. E02F 3/627
[52] U.S. Cl. ........................................ 414/686; 172/275
[58] Field of Search ................................. 414/686, 694, 414/680; 296/204, 205; 280/781, 785, 796, 798; 172/272–275

[56] References Cited

U.S. PATENT DOCUMENTS

| | | | |
|---|---|---|---|
| 3,949,889 | 4/1976 | Moe ........................................ | 414/686 |
| 4,087,009 | 5/1978 | Profenna et al. . | |
| 4,554,978 | 11/1985 | Schneider ............................ | 414/686 X |
| 4,737,067 | 4/1988 | Samejima et al. . | |
| 4,968,213 | 11/1990 | Langenfeld .............................. | 414/686 |
| 5,248,237 | 9/1993 | Nakamura . | |
| 5,387,075 | 2/1995 | Aoki ........................................ | 414/686 |

FOREIGN PATENT DOCUMENTS

| | | |
|---|---|---|
| 632188 | 2/1994 | Japan . |
| 2147186A | 5/1985 | United Kingdom . |
| 2218891 | 11/1989 | United Kingdom . |
| 2252278A | 8/1992 | United Kingdom . |
| 8103154 | 11/1981 | WIPO . |

*Primary Examiner*—Donald W. Underwood
*Attorney, Agent, or Firm*—Webb Ziesenheim Logsdon Orkin & Hanson, P.C.

[57] ABSTRACT

A reinforcing frame structure for coupling a front loader (6) to a front region of a tractor body (5) and a working implement to a rear region thereof. The reinforcing frame structure (8) includes right and left frames (13) arranged laterally of the tractor body (5) and extending longitudinally thereof, a first cross bar (14) for rigidly interconnecting the right and left frames in rearward positions thereof, a rear connecting mechanism (12) formed integrally with the rearward positions of the right and left frames to be connectable to a rear axle case (18) of the tractor body from below, a working implement coupling mechanism (11) for coupling the working implement, a loader coupling mechanism (9) for coupling the front loader, and a front connecting mechanism (16) for connecting forward regions of the right and left frames to the tractor body. The rear connecting mechanism (12) includes a holding mechanism for holding opposite ends of the rear axle case (18), whereby the reinforcing frame structure (8) is attachable to and detachable from the tractor body (5) from below.

19 Claims, 13 Drawing Sheets

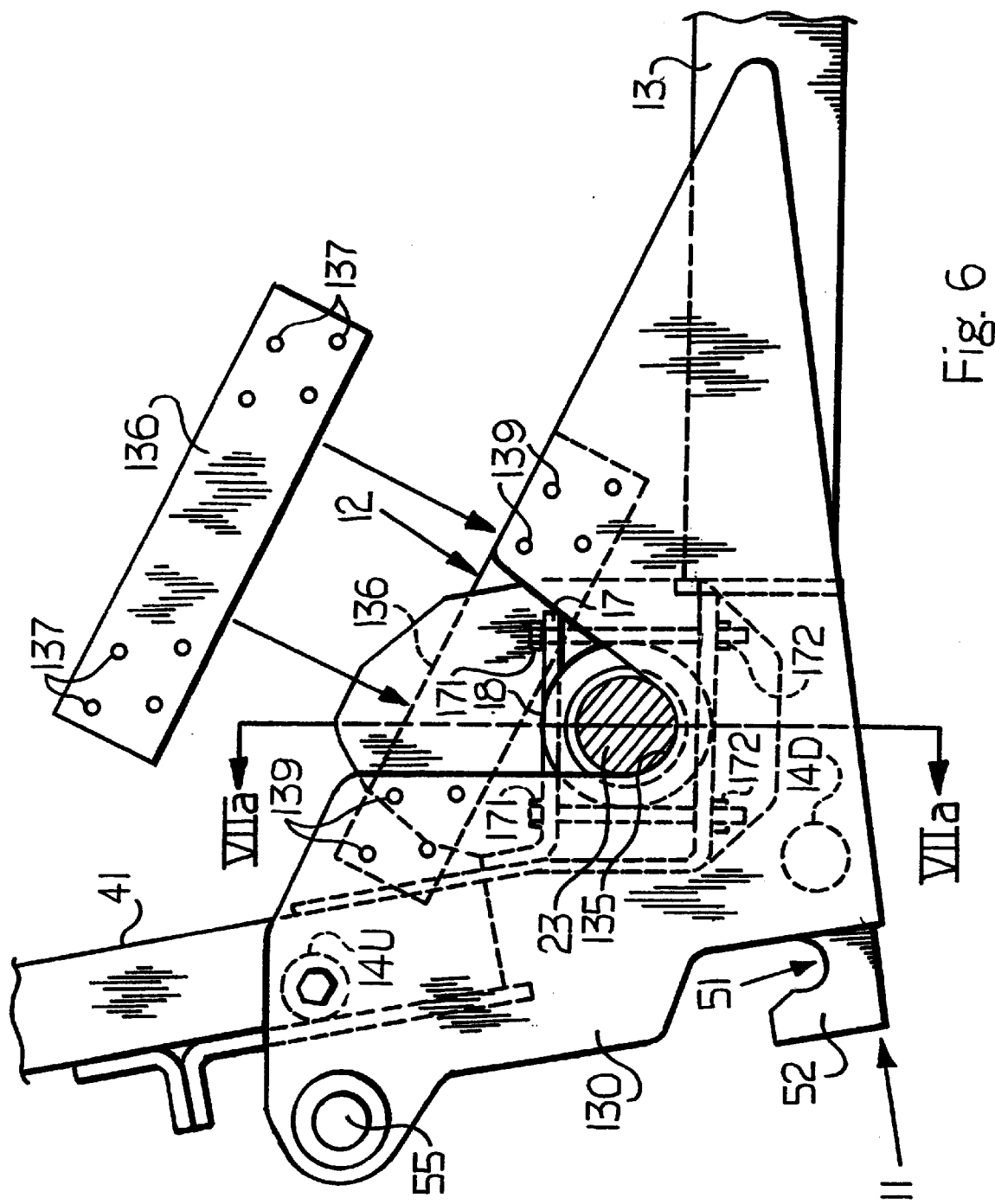

REINFORCING FRAME STRUCTURE FOR A TRACTOR

BACKGROUND OF THE INVENTION

1. Field of the Invention

The present invention relates to a reinforcing frame structure for a tractor for use in coupling a front loader to the front of the tractor and a rear working implement such as a backhoe to the rear of the tractor. More particularly, the invention relates to a reinforcing frame structure detachably attached to a body of an agricultural tractor or the like to reinforce rigidity thereof and to couple working implements to the front and rear of the tractor body.

2. Description of the Related Art

Japanese Patent Publication Kokai No. 6-32188, for example, discloses such a reinforcing frame structure. This reinforcing frame structure is dividable transversely of a tractor body to couple a front loader to the front of the tractor body, and a different working implement to the rear of the tractor body. This reinforcing frame structure includes triangular plates fixed to pipe-like right and left frames to support a rear axle case. The rear axle case has ends thereof extending through the triangular frames for support. Therefore, the reinforcing frame structure must be assembled sideways to the tractor body before attaching the rear wheels.

U.S. Pat. No. 5,248,237 discloses another example of such reinforcing frame structure. This structure may have a working implement such as a front loader and a rear working implement such as a backhoe coupled thereto. The reinforcing frame structure includes two reinforcing frames arranged on each side of a tractor body. A first reinforcing frame extending laterally of the tractor body and a second reinforcing frame extending slightly inside the first reinforcing frame are both fixedly connected at forward ends thereof to a cross bar extending transversely of the tractor body.

GB 22 18 891 discloses a further example of reinforcing frame structure, in which a front loader is coupled to the front of a tractor, and a backhoe to the rear thereof. Reinforcing frames are arranged on right and left sides of a tractor body. These reinforcing frames are connected to the tractor body through two brackets. The reinforcing frames include mast mounts formed in forward end positions thereof for receiving masts of the front loader.

Further, U.S. Pat. No. 4,737,067 discloses a mounting mechanism (not referred to as a reinforcing frame) for attaching a working implement to a tractor. This patent discloses a pair of frames as one example, which are spaced from each other by a distance smaller than a width of a tractor body. These frames are attached in forward positions thereof to a transmission case through brackets or directly to an engine.

The first three prior publications have a common feature that right and left frames are connected to the tractor body independently of each other. With the reinforcing frame structure disclosed in each of these publications, each of the reinforcing frames is connected sideways to the tractor body or to varied elements or brackets attached to the tractor body. The reinforcing frame structure cannot be attached in assembled state to a completed tractor body. Thus, as far as the efficiency of assembling the reinforcing frame structure to a completed tractor body is concerned, the above structures disclosed in the prior publications including the fourth publication leave considerable room for improvement. With the reinforcing frame structure connected to the tractor body, a force may be applied to right and left couplings of the front loader, and a force and moment may occur to a rear working implement coupling due to an operation of the backhoe. None of these publications describe or specifically disclose a measure for diminishing the magnitude of such a force (stress) and moment conducted through the reinforcing frame structure to the tractor body.

In U.S. Pat. No. 5,248,237, for example, tubular elements extending laterally of the tractor body include mast mounts for receiving masts of the front loader. These mast mounts are formed in the tubular elements (or cross bars) extending transversely of the tractor body. As seen from FIGS. 2 and 3 of this patent, the cross bars extending transversely are connected to the tractor body through brackets, respectively. Forces applied to the right and left masts of the front loader are conducted to the tractor body through the mast mounts, tubular elements and brackets. Consequently, the stress or moment is considered to act in reduced magnitude on the tractor body. However, since the cross bars do not extend over an entire width of the tractor body, a large part of strain energy due to the stress or moment applied to the mast mounts must in substance be absorbed by lateral walls of the tractor body.

In the structure disclosed in Japanese Patent Publication Kokai No. 6-32188, a backhoe acting as the rear working implement is coupled to a pair of triangular plates formed in rearward positions of the reinforcing frames. The forces applied to right and left couplings of the backhoe are transmitted through the right and left triangular plates to right and left extensions of the rear axle case. Thus, a large part of the forces (stress or moment) produced at the backhoe couplings due to the force conducted from the backhoe is conducted directly to the rear axle case.

In the structure disclosed in GB 22 18 891, masts are attached directly to forward ends of the reinforcing frames extending laterally of the tractor body. The reinforcing frames are connected adjacent rear ends thereof to the tractor body through two brackets. Thus, components of force and moment resulting from an operation of the front loader are conducted to the tractor body through the right and left reinforcing frames and brackets.

SUMMARY OF THE INVENTION

An object of the present invention is to provide a reinforcing frame structure for coupling a front loader and a different working implement, which frame structure may be assembled to a tractor body with ease.

Another object of the invention is to provide a reinforcing frame structure for assembly to a tractor, for absorbing a predetermined proportion of a reaction acting transversely of a tractor body during operation of a front loader or a backhoe, and of a torsional moment resulting from an imbalance or the like of right and left forces applied from the front loader or backhoe, thereby to minimize an undesirable force and torsional moment conducted to the tractor body, and to increase operating outputs of the front loader and backhoe.

The above objects are fulfilled, according to the present invention, by the following constructions:

(I)

A reinforcing frame structure for coupling a front loader to a front region of a tractor body and a working implement to a rear region thereof, the tractor body having an engine and a transmission case interconnected and arranged longitudinally thereof, with a front axle frame extending from the engine, the reinforcing frame structure comprising:

right and left frames arranged laterally of the tractor body and extending longitudinally thereof;

a first cross bar for rigidly interconnecting the right and left frames in rearward positions thereof;

a rear connecting mechanism formed integrally with the rearward positions of the right and left frames to be connectable to a rear axle case of the tractor body from below;

a front connecting mechanism for connecting forward regions of the right and left frames to the tractor body;

a working implement coupling mechanism for coupling the working implement; and a loader coupling mechanism for coupling the front loader;

wherein the rear connecting mechanism includes receiving portions for receiving the rear axle case from below, and a holding mechanism for holding opposite ends of the rear axle case, whereby the reinforcing frame structure is attachable to and detachable from the tractor body from below.

The reinforcing frame structure having the above construction is readily attachable to a completed tractor body from below. The entire reinforcing frame structure may be detached downward from the tractor body with ease when the tractor is used on its own without the working implements.

(II)

The construction (I) above may further comprise a second cross bar extending transversely of the tractor body for interconnecting the right and left frames in positions adjacent the forward ends thereof. This cross bar may include extensions at opposite ends thereof disposed laterally outwardly of the right and left frames, with mast mounting brackets formed on the extensions. The second cross bar may also include a pair of connecting arms connectable to the tractor body, each connecting arm having a predetermined arm length.

With the reinforcing frame structure having the above construction, part of strain energy due to a force transmitted from the masts of the front loader is absorbed by elastic deformation such as bending and twisting of the second cross bar extending transversely adjacent the forward ends of the right and left frames. Such elastic deformation of the cross bar is restrained by the right and left frames. That is, part of the torsional energy absorbed by the cross bar is absorbed also by the right and left frames. Further, the torsional energy absorbed by the right and left frames is distributed to the first cross bar at the ends of the frames and to the rear axle case. Thus, varied forms of force (e.g. tensile, compressive and bending forces) and moment (e.g. bending moment and torsional moment) resulting from an operation of the front loader are conducted in reduced magnitude to the tractor body. Further, since the connecting arms have a predetermined arm length, elastic deformation of the connecting arms is expected to absorb a certain proportion of strain energy, thereby to diminish the strain energy to be absorbed by the tractor body. The first cross bar, second cross bar and right and left frames form a rectangular framework. A large part of torsional moment acting on any part of the frame structure is absorbed within the frame structure. Thus, the tractor body connected to the frame structure received forces and moments in reduced magnitude. Since the strain energy to be absorbed by the tractor body is reduced, the working implement or front loader is operable with an increased output compared with TLB (tractor/front loader/backhoe) having a conventional reinforcing frame structure. Naturally, the backhoe or front loader may be made operable with a further increased output by designing the components (right and left frames, first cross bar and second cross bar) of the reinforcing frame structure to have increased section moduli.

(III)

The rear axle case and the holding mechanism of the rear connecting mechanism may be interconnected to be movable within a predetermined range transversely of the tractor body. The rear axle case may also be rotatable relative to the holding mechanism.

With the above construction between the reinforcing frame structure and rear axle case, undesirable components of force such as twists transmitted from the backhoe acting as a rear working implement are not conducted directly to the rear axle case.

(IV)

The pair of connecting arms extending from the second cross bar may be in the form of flat arms extending parallel to side walls of the tractor body.

With this construction, the connecting arms are elastically deformable particularly easily under sideways forces transmitted from the masts of the front loader. Thus, sideways components of forces from the masts are never conducted to the tractor body. However, the connecting arms of this shape have high rigidity against a gravitational force and, therefore, a gravitational force applied to the masts is conducted to the tractor body through the connecting arms to be received by the front wheels.

Other features and advantages of the present invention will be apparent from the following description of the preferred embodiments taken with reference to the drawings.

BRIEF DESCRIPTION OF THE DRAWINGS

FIG. 6 is a side view of a rear portion of the reinforcing frame structure connected to an axle case;

FIG. 7b is an enlarged view of a portion of FIG. 7a;

DETAILED DESCRIPTION OF THE PREFERRED EMBODIMENTS

Embodiments of the present invention will be described hereinafter with reference to the drawings.

Figure 1:
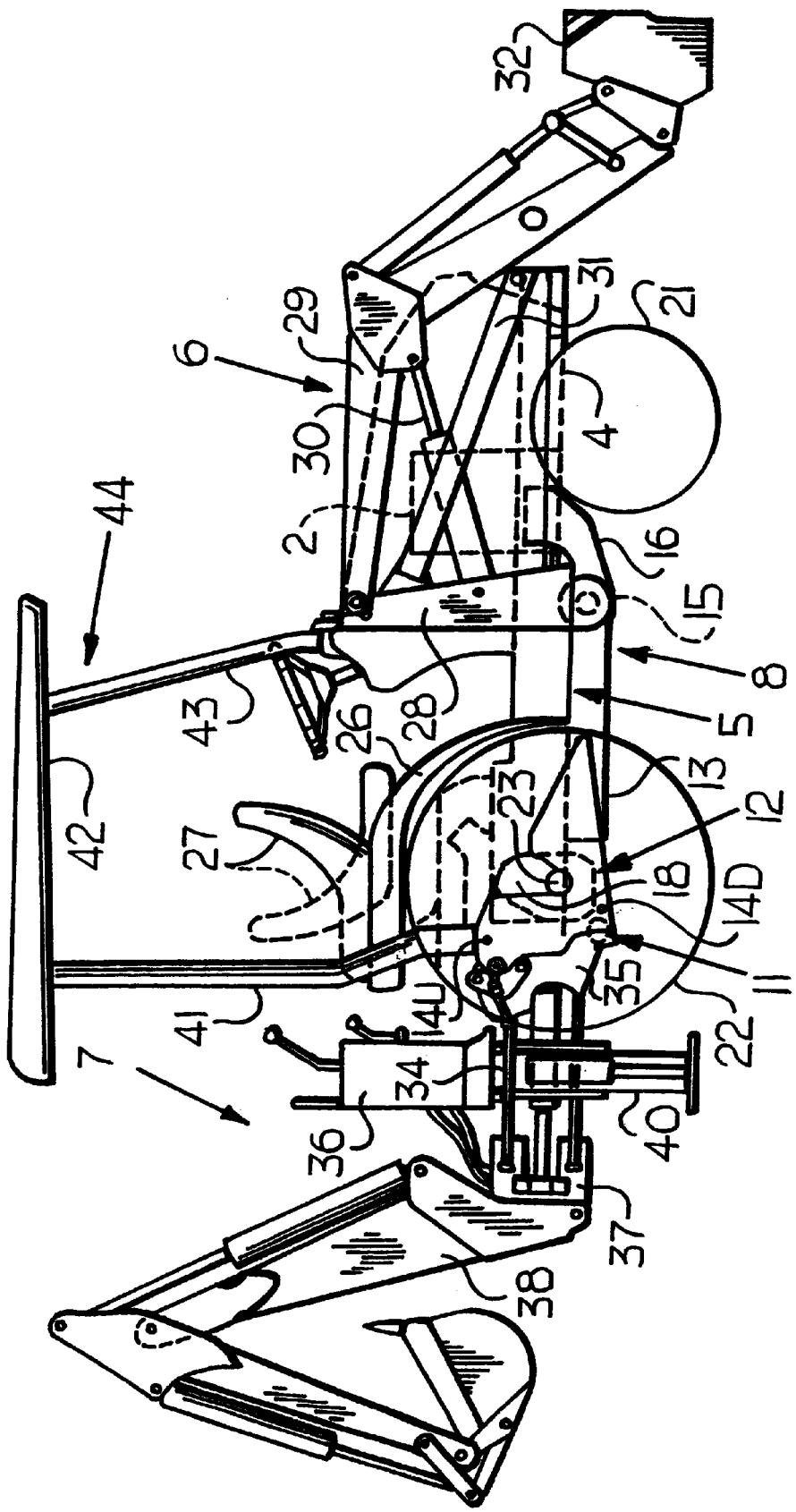
FIG. 1 is a side elevation of a tractor with front loader and backhoe (TLB) according to the present invention.

FIG. 1 shows an overall construction of a tractor with front loader and backhoe (TLB). In this example, a tractor body 5 has a front loader 6 attached to the front thereof, and a backhoe 7 which is one example of rear working implements attached to the rear thereof.

The tractor body 5 includes an engine 2, a flywheel housing, a clutch housing and a transmission case 3 interconnected and arranged longitudinally of the tractor. A front axle frame 4 extends forward from side walls of the engine 2. Reference numeral 21 denotes front wheels, 22 rear wheels, 23 rear axles, and 18 a rear axle case. In a rearward region of the tractor body 5, the rear axle case 18 extends right and left from the transmission case 3, and the rear axles 23 further extend right and left from the rear axle case 18.

The rear axle case 18 supports right and left rear fenders 26. The tractor body 5 has a driver's seat 27 disposed between the right and left rear fenders 26.

The front loader 6 acting as a front working implement includes masts 28, booms 29, boom cylinders 30, braces 31 and a bucket 32.

The backhoe 7 acting as a rear working implement includes a base 34, a bracket 35 disposed forwardly the base 34, a control unit 36 disposed above the base 34, a swing bracket 37 pivotally connected to a rear end of the base 34, a boom 38 pivotally connected to the swing bracket 37 through a cross pin, a bucket attached to a distal end of the boom 38, and outriggers 40.

Reference numeral 44 denotes an upstanding frame structure erected in a rearward region of the tractor body 5, with a canopy 42 attached to an upper end thereof. The canopy 42 is supported in forward positions thereof by forward struts 43, and in rearward positions by rear struts 41. The forward struts 43 are connected to a mast mount 28 or the tractor body 5. The rear struts 41 are connected to rearward positions of a reinforcing frame structure 8 described hereinafter.

Figure 2:
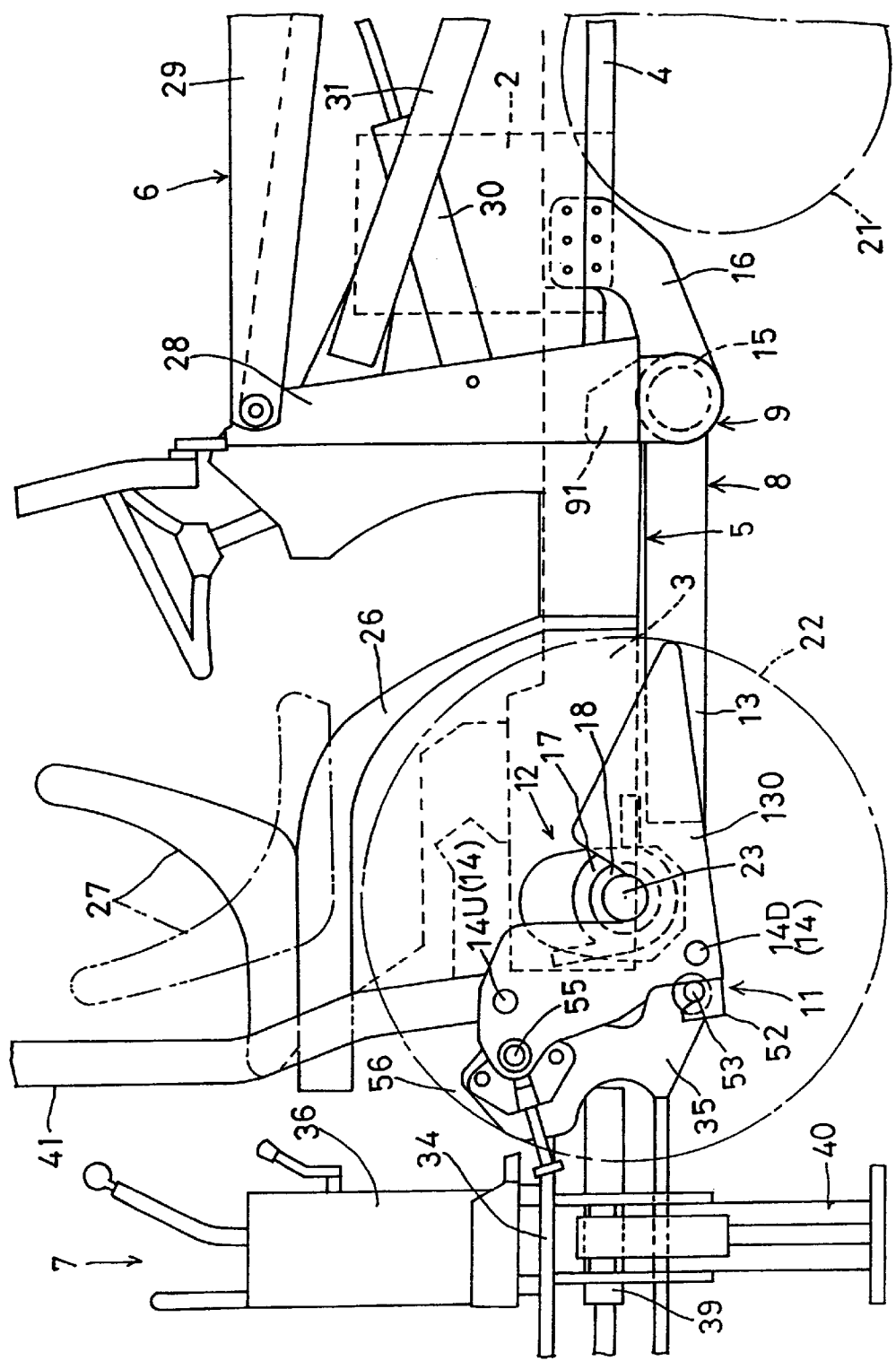
FIG. 2 is a fragmentary side view of the TLB embodying the present invention.

The reinforcing frame structure 8 will be described next with reference to FIGS. 2 through 4. The reinforcing frame structure 8, as shown in FIGS. 1 and 2, has the front loader 6 connected to a forward position thereof, and the rear working implement (backhoe 7) connected to a rear position. The reinforcing frame structure 8, broadly, includes right and left frames (square pipes 13 in this embodiment) for forming a rectangular shape in plan view; a front cross bar 15 and rear cross bars 14 for interconnecting the right and left frames in forward positions and in rearward positions thereof, respectively; a loader coupling mechanism 9 for attaching the front loader 6; a working implement coupling mechanism 11 for attaching the rear working implement; and a front connecting mechanism 16 and a rear connecting mechanism 12 for connecting the reinforcing frame structure 8 to the tractor body 5.

(a-1) Basic Construction of Reinforcing Frame Structure 8

A basic frame construction will be described next with reference to FIGS. 2 and 4. The right and left frames 13A and 13B comprise square pipes 13 extending along lateral sides of the tractor body 5 and interconnected at forward ends thereof by the front cross bar 15. Each square pipe 13 has a triangular frame 130 rigidly attached to the rear end thereof. The triangular frame 130 is rigidly connected to the rear end of each square pipe 13 through an L-shaped reinforcing element 131. The right and left triangular frames 130 are interconnected by the rear cross bars 14. The rear cross bars 14 include an upper, first rear cross bar 14U, and a lower, second rear cross bar 14D. The second rear cross bar 14D is directly connected to the triangular frames 130, while the first rear cross bar 14U is connected to flat support plates 54 extending rearwardly of the reinforcing elements 131 and parallel to the triangular frames 130. The support plates 54 have forward ends thereof rigidly connected, such as by welding, to the reinforcing elements 131 to increase rigidity of the triangular frames 130, respectively.

(a-2) Loader Coupling Mechanism 9

The loader coupling mechanism 9 of the reinforcing frame structure 8 will be described with reference to FIGS. 2, 4 and 5. As seen from FIGS. 2 and 4, the front cross bar 15 has extensions 15A and 15B formed at opposite ends thereof and extending laterally outwardly of the right and left frames 13. Each of the extensions 15A and 15B has a mast mounting bracket 91 (corresponding to the loader coupling mechanism 9) formed at an end thereof for attaching the mast 28 of the front loader 6.

(a-3) Working Implement Coupling Mechanism 11

The working implement coupling mechanism 11 of the reinforcing frame structure 8 will be described with reference to FIGS. 2, 4 and 5. The backhoe 7 has the bracket 35 attached to the forward end thereof for connection to the tractor body 5. As shown in FIGS. 1 and 2, the front bracket 35 includes a coupling 56 disposed in an upper portion thereof to be vertically pivotable between an open position and a closed position, and a coupling pin 53 disposed in a lower portion thereof and extending transversely of the tractor body 5.

Each of the triangular frames 130 has a lower coupling 52 (corresponding to the working implement coupling mechanism 11) formed in a lower rear portion thereof and defining an upwardly opening recess 51. Each triangular frame 130 is connected to the support plate 54 by an upper coupling pin 55 (corresponding to the working implement coupling mechanism 11). As seen from FIGS. 2 and 4, the lower coupling pin 53 of the backhoe 7 is engageable with the recesses 51 in the lower couplings 52 of the reinforcing frame structure 8. The backhoe 7 is coupled to the reinforcing frame structure 8 by pivoting the bracket 35 of the backhoe 7 about the lower couplings 52, and causing the openable and closable coupling 56 to catch the upper coupling pins 55 from above and below.

Thus, the upper coupling pins 55 and lower couplings 52 constitute the working implement coupling mechanism 11 of the reinforcing frame structure 8.

In the manner described above, the front loader 6 is attachable to the front of the reinforcing frame structure 8, and the backhoe 7 to the rear thereof. The front connecting mechanism 16 and rear connecting mechanism 12 for connecting the reinforcing frame structure 8 to the tractor body 5 will be described next with reference to FIGS. 2 and 4.

(a-4) Front Connecting Mechanism 16

The front connecting mechanism 16 includes a pair of connecting arms 16 extending from intermediate positions 15c of the front cross bar 15 of the reinforcing frame structure 8 inwardly of the right and left frames 13. The connecting arms 16 are rigidly connected such as by welding to the cross bar 15, and extend laterally of the tractor body 5. As shown in FIGS. 4 and 5, the connecting arms 16 define bolt bores 16a (corresponding to the body connector) for connection to the front axle frame 4. Alternatively, the connecting arms 16 may be fixed to the side walls of engine 2, instead of being connected to the front axle frame 4. Each connecting arm 16 includes the body connector 16a for connecting a forward portion of the arm 16 to the tractor body 5, a reinforcing frame connector 16b for connection to the front cross bar 15, and an arm portion 16c between the body connector 16a and reinforcing frame connector 16b. The arm portion 16c has a predetermined arm length and a flat section as illustrated, to be elastically deformable relatively easily under a force applied transversely of the tractor body 5 (the orientation of such a force is shown in FIG. 5a by arrow 98).

Figure 5A:
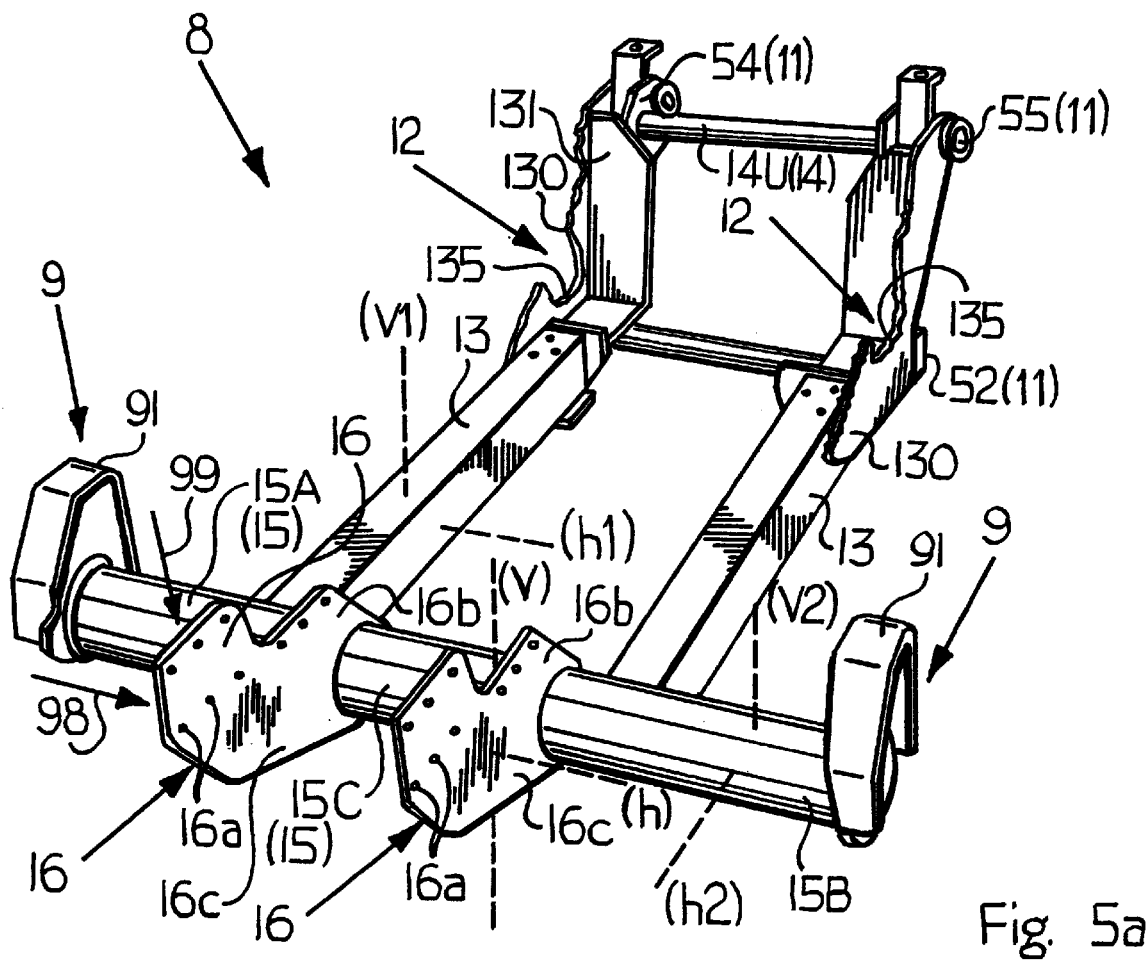
FIG. 5a is a frontal perspective view of the reinforcing frame structure.

The connecting arms 16 are shaped to have high rigidity against a gravitational force (the orientation of such a force is shown in FIG. 5a by arrow 99). Thus, a gravitational force applied to the mast mounting brackets 91 is conducted directly to the tractor body 5 to be received by the front wheels 21. That is, the connecting arms 16 are little deformable under a bending moment acting about the axis of the front cross bar 15. However, since the connecting arms 16 have the arm portions 16c of the predetermined length, the connecting arms 16 are elastically deformable to a greater extent under such a bending moment than where the front cross bar 15 of the frame structure 8 is rigidly incorporated into the tractor body 5. With the masts attached to the opposite ends of the front cross bar 15, a force or a varied kind of moment applied to the masts twists or bends the front cross bar 15, whereby a certain proportion of the strain energy is absorbed. Then, the arm portions 16c are readily and elastically deformed in certain directions, to further absorb the strain energy, thereby diminishing the force or moment conducted to the tractor body 5.

Figure 4:
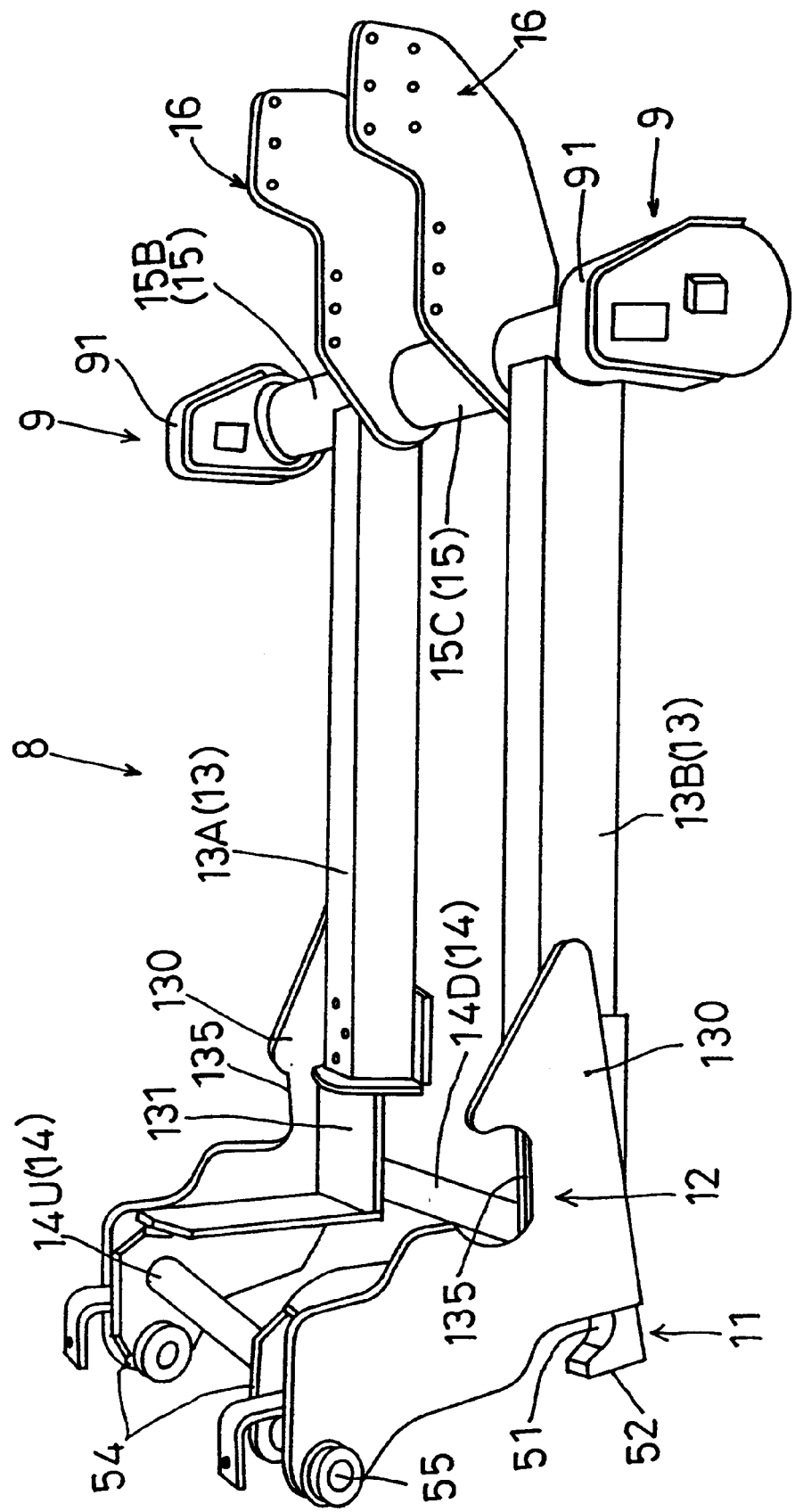
FIG. 4 is a lateral perspective view of the reinforcing frame structure.
Figure 5B:
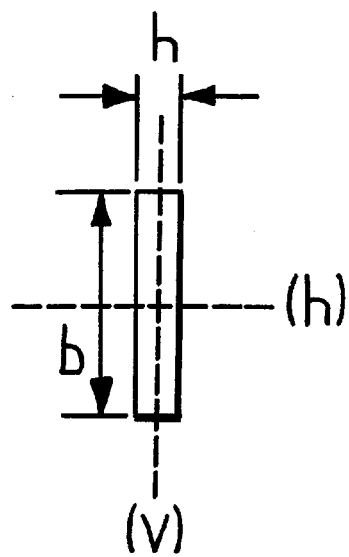
FIG. 5b is a sectional view of a connecting arm acting as a front connecting mechanism of the reinforcing frame structure.

The arm portion 16c of each connecting arm 16 has such a sectional shape that, as seen from FIGS. 4, 5a and 5b, section modulus Z1 with respect to a vertical axis v extending vertically through the middle in the direction of thickness of the connecting arm is much smaller than section modulus Z2 with respect to a horizontal axis h extending horizontally through the middle in the direction of width of the connecting arm.

This relationship will be described with reference to FIG. 5b.

$$Z1 = b \times h^2/6 \quad (1)$$

$$Z2 = h \times b^2/6 \quad (2)$$

$$Z2 > Z1 \times N$$

where

Z1=section modulus of the connecting arm with respect to the vertical axis (v);

Z2=section modulus of the connecting arm with respect to the horizontal axis (h);

b=width of the connecting arm (16);

h=thickness of the connecting arm (16); and

N=integers (1,2,3, . . . ).

The section modulus Z1 with respect to the vertical axis v of the connecting arm 16 relative to the tractor body 5 should be smaller than section modulus (Z3, Z4) with respect to axes (v1; v2) of the right and left pipes 13 and the front cross bar 15. The relationships between the respective section moduli will be described hereinafter.

$$Z1 < (1/N) \times \text{MIN}(Z3:Z4) \quad (3)$$

where

Z3=modulus of the square pipe (13) with respect to the vertical axis;

Z4=modulus of the cross bar (15) with respect to the vertical axis;

N=integers (1, 2, 3, . . . ); and

MIN (:)=function to choose the smaller one in the brackets.

In the above expression (3), N should be selected properly in order to facilitate deformation of the connecting arm 16 under a force acting sideways. Thus, the sectional shape of each connecting arm 16 should be selected to be elastically deformable to a large extent under a force acting in a particular direction. The shape need not be rectangular as shown in FIGS. 4 and 5.

This specification uses the term optional structure for a structure for deliberately increasing the elastic deformation under a force acting in a particular direction to be much greater than elastic deformation under a force acting in a different direction, or for a structure for producing no reaction to a component of force acting in a particular direction. Each connecting arm has the optional structure, and the connection between the connecting arm and tractor body is called herein an optional connection.

(a-5) Rear Connecting Mechanism 12

Figure 7A:
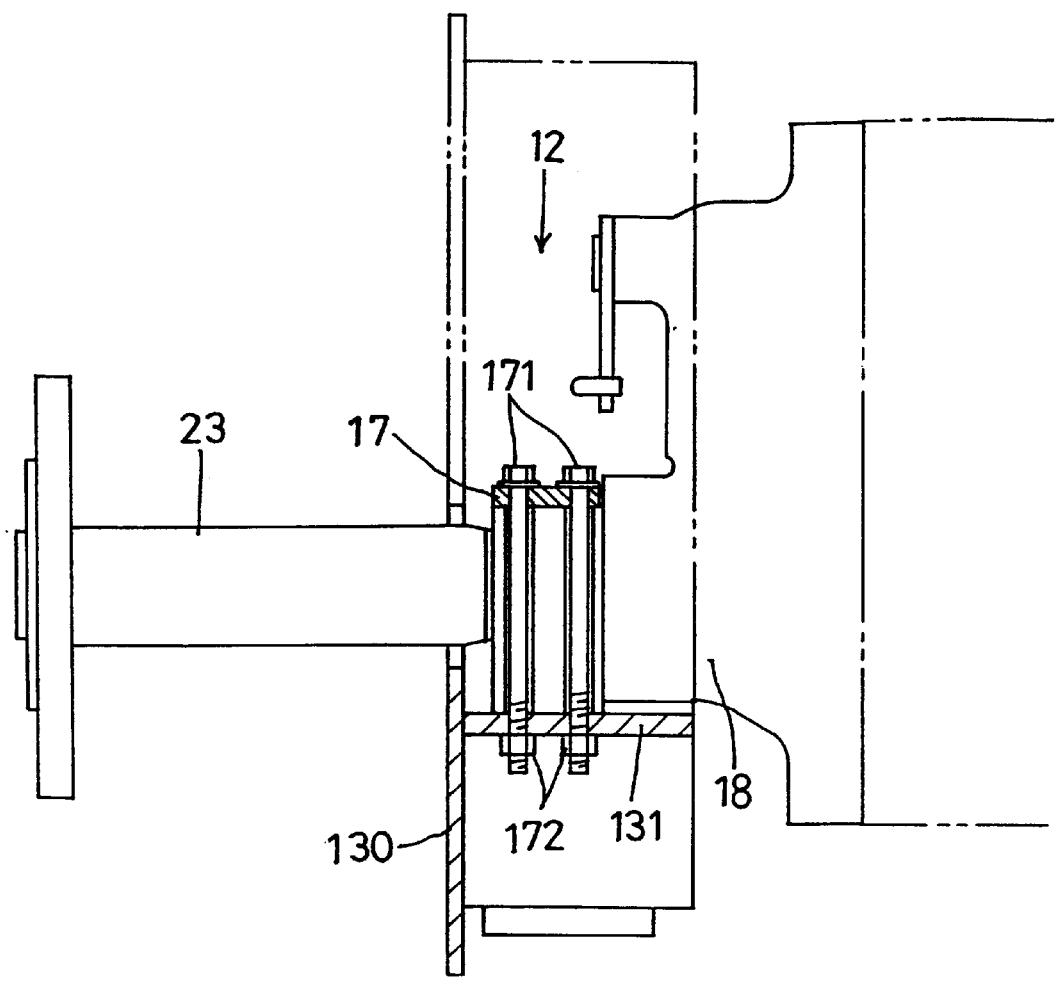
FIG. 7a is a section taken on line VIIa—VIIa of FIG. 6.
Figure 7B:
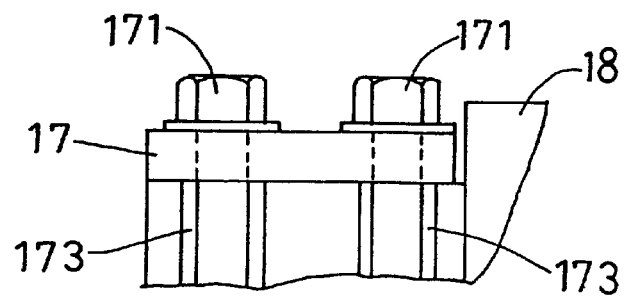

The rear connecting mechanism 12 of the reinforcing frame structure 8 includes upwardly opening recesses (U-shaped recesses) 135 formed in the reinforcing elements 131 and triangular frames 130 to act as basic components thereof. As shown in FIGS. 6 and 7a–7c, the rear connecting mechanism 12 also includes holders 17 for supporting the rear axle case 18 of the tractor body 5. As shown in FIGS. 6 and 7a, each triangular frame 130 defines the recess 135 for receiving the rear axle 23 extending from an end of the rear axle case 18. With the rear axle 23 fitted in the recess 135 of the triangular frame 130, the holder 17 is attached to the rear axle case 18 from above, and fixed to a lower surface of the reinforcing element 131 by bolts 171 and nuts 172. As shown in FIGS. 7a and 7b in particular, the rear axle case 18 defines circumferential grooves 173. Each groove 173 has a width for forming a predetermined gap with an outside diameter of the bolt 171. Thus, with the holder 17 secured to the reinforcing element 131, the rear axle case 18 is displaceable within a predetermined range transversely of the tractor body 5.

Figure 7C:
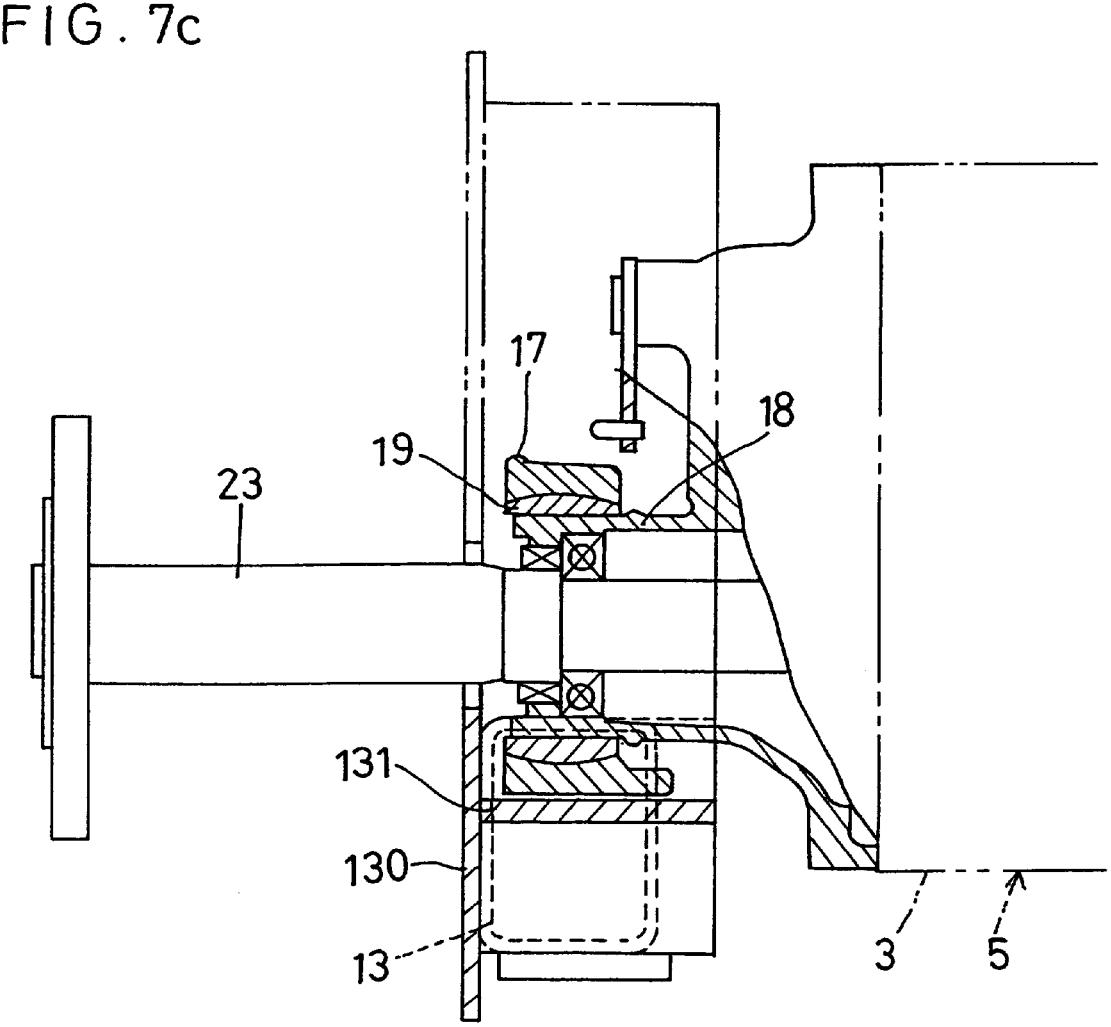
FIG. 7c is a view showing a different mode of connection between the rear portion of the reinforcing frame structure and the axle case.

As shown in FIG. 7c, the holder 17 may include a bearing 19 or the like disposed on an inner periphery thereof to provide an increased freedom of relative displacement between the triangular frame 130 and rear axle case 18. In this case, however, the bearing 19 must be attached to the rear axle case 18 in advance. With each rear axle case 18 fixed to the rear connecting mechanism 12 as described above, a retainer plate 136 shown in FIG. 6 is attached to the triangular frame 130, to interconnect the rear axle case 18 and reinforcing frame structure 8 with greater assurance. As shown in FIG. 6, the retainer plate 136 may be bolted to the triangular frame 130 by placing a plurality of fixing bores 137 formed in the retainer plate 136 in register with threaded bores formed in the triangular frame 130.

A spacer or the like may be fitted peripherally of each bolt 171 so that, with the holder 17 fixed to the reinforcing element 131 by bolts or the like, the holder 17 and the reinforcing element 131 define a vertical space therebetween which is slightly larger than dimensions of the rear axle case 18 mounted in the space. Each holder 17 may include an elastic element mounted on a lower surface thereof for filling a gap between an upper end of the rear axle case 18 and the lower surface of the holder 17, thereby to absorb vibration and the like due to the gap. With this construction, a large part of torsional moment about the rear axles applied from the rear working implement (backhoe) to each triangular frame 130 is absorbed by a relative rotation between the rear axle case 18 and holder 17. Thus, the torsional moment is conducted in a significantly reduced degree to the tractor body 5.

(a-6)

Figure 3:
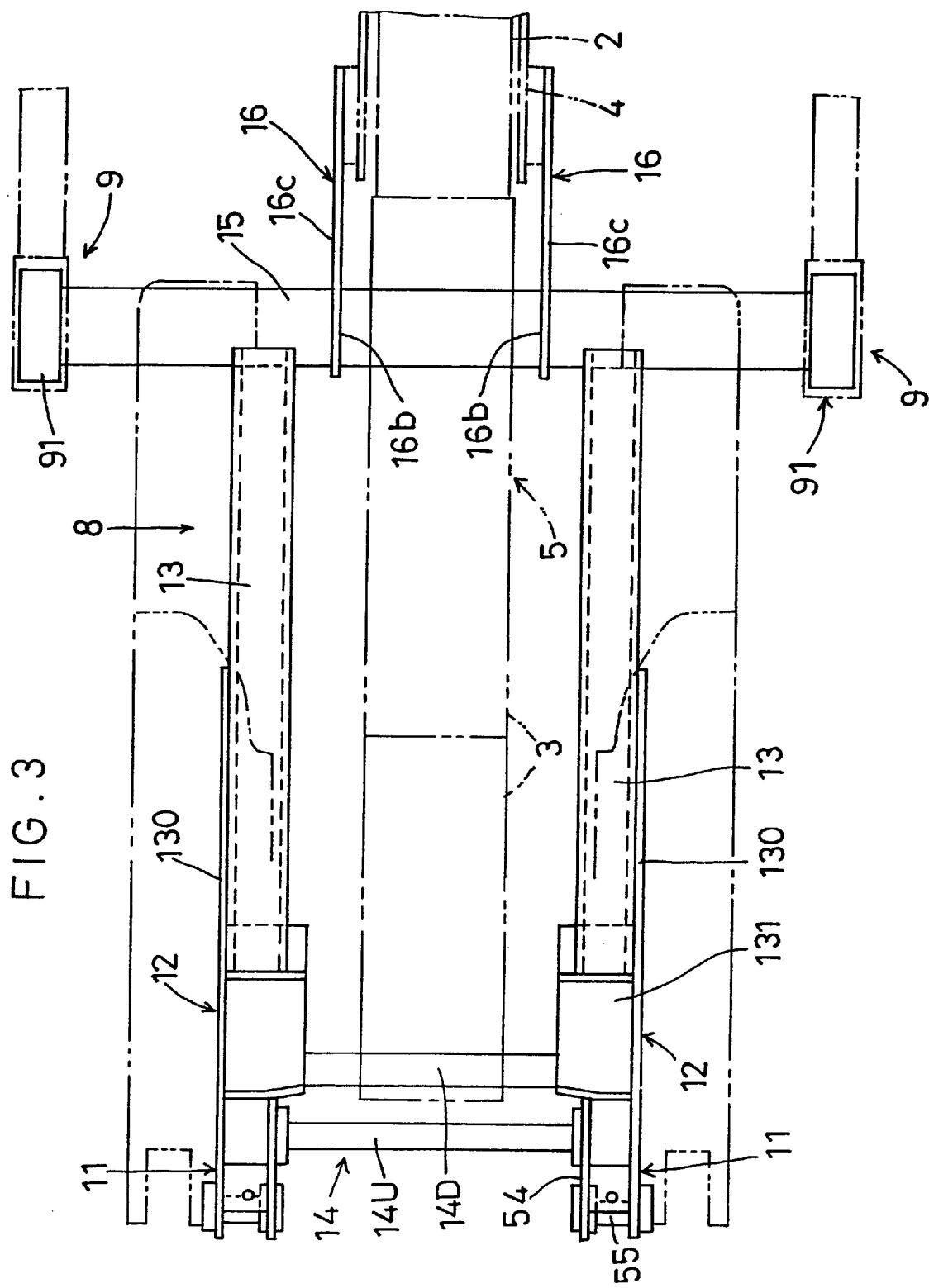
FIG. 3 is a plan view showing a relationship between reinforcing frame structure and tractor body.

As shown in FIG. 3, the reinforcing frame structure 8 is connected to the tractor body 5 through the front connecting mechanism 16 and rear connecting mechanism 12. The pair of connecting arms 16 of the front connecting mechanism 16 have a spacing between inner walls thereof slightly larger than a distance between outer walls of the front axle frame 4. Further, since the recesses 135 of the triangular frames 130 open upward, the reinforcing frame structure 8 in assembled state may be attached, from below, to the tractor body 5 as a completed vehicle. As seen from FIGS. 1 and 2 in particular, the frame structure 8 may be assembled to the tractor body 5 with ease since access may easily be made, laterally of the tractor body 5, to the bolt bores 16a of the connecting arms 16 acting as the front connecting mechanism. With the rear connecting mechanism 12, an assembly operation must be carried out inwardly of the rear wheels 22 of the tractor body 5 to place the rear axle case 18 in the recesses 135 and fix the rear axle case 18 with the holders 17 as shown in FIG. 6. Therefore, a simple mechanism may be provided for temporarily attaching the rear axle case 18 to the triangular frames 130. Such a temporary attaching mechanism may comprise pivotally connecting one end of each retainer plate 136 to the triangular frame 130.

(b-1) Absorption of Distorting Energy Produced by Operation of Front Loader

With the reinforcing frame structure 8 connected to the tractor body 5, an operation of the front loader 6 may produce a force (i.e. strain energy due to this force) acting on the masts. The way in which the strain energy is absorbed by the reinforcing frame structure 8, and the way in which the strain energy is conducted to the tractor body 5, will be described next. The description will be made exemplifying a case in which a force acts on upper ends of the mast 28 counterclockwise in FIGS. 2 and 8. This force produces a counterclockwise bending moment acting on the mast mounting brackets 91 of the reinforcing frame structure 8. This bending moment twists the front cross bar 15 counterclockwise to distort the front cross bar 15. This distortion is restrained by the square pipes 13 and connecting arms 16. In other words, a large part of the bending moment acting on the mast mounting brackets 91 is absorbed by distortion of the front cross bar 15, deformation of the square pipes 13 and deformation of the connecting arms 16. Thus, since part of the bending moment is absorbed by distortion of the front cross bar 15, and deforms the square pipes 13, the bending moment is already diminished before being conducted to the connecting arms 16. Further, since the connecting arms 16 include the arm portions 16c having the predetermined length as noted hereinbefore, part of the bending moment, though slight, is absorbed by the elastic deformation of the connecting arms 16 due to the arm length, before being conducted to the body connectors 16a. Consequently, this connecting structure greatly diminishes the bending moment conducted to the tractor body 5, compared with the case where the front cross bar is connected directly to the tractor body. This feature enables increased power of the front loader 6, without requiring increased strength of the tractor body 5. In the present invention, the connecting arms 16 may be connected directly, such as by bolts, to the tractor body 5, e.g. lower side walls of the engine 2. Where the connecting arms 16 are connected to the front axle frame 4 as shown in FIGS. 1 through 3, the magnitude of the bending moment and force (stress) conducted to the tractor body 5 may be diminished since the front axle frame 4 is elastically deformable.

However, since the connecting arms 16 are shaped to have great rigidity in vertical directions, most of the gravitational force due to attachment of the front loader 6 is borne by the front wheels 21. Gravitational forces are borne by the pair of front wheels 21 and the pair of rear wheels, and in relation to the backhoe by the outriggers 40 when engaging the ground. Therefore, the absolute values of the forces borne by these components will never be diminished however rigid the reinforcing frame structure 8 may be.

The square pipes 13 are interconnected at the rear ends thereof in loop form by the rear cross bars 14, whereby the above bending stress is conducted in a greatly reduced proportion to the rear region of the tractor body 5. As noted above, a large part of the bending stress of the mast mounting brackets 91 is absorbed as strain energy by the elastic deformation of the varied components of the reinforcing frame structure 8. This lowers the absolute value of the stress conducted to the tractor body 5. In this way, the front loader 6 is made operable with an increased upper limit of power.

(b-2) Absorption of Distorting Energy Produced by Operation of Backhoe

A way in which the reinforcing frame structure 8 of the present invention attached to the tractor body 5 enables increased output of operation of the rear working implement will be described next.

Referring again to FIG. 8, description will be made, assuming that a bending stress (corresponding to Fx2) about the axles and centering on the lower couplings D2 acts on the upper coupling pins 55 (or a bending moment centering on the upper coupling pins 55 acts on the lower couplings 52). In the event of such a bending moment, its strain energy is conducted substantially directly to the connections between the forward ends of the triangular frames 130 and the square pipes, without being absorbed by the triangular frames 130 which are highly rigid against the moment acting in this direction. As a result, the right and left square pipes 13 are elastically deformed by a bending stress applied to the rear ends thereof. However, as described with reference to FIG. 6, the rear axle case 18 is rotatable relative to the triangular frames 130. The bending moment, therefore, is in substance not conducted to the rear axle case 18. Thus, a large part of such a bending moment is absorbed by the reinforcing frame structure 8. Compared with a structure where the triangular frames 130 or the right and left frames (square pipes 13) are connected directly to the rear axle case 18, the tractor body 5 is subjected to little distorting force. As a result, an operation of the backhoe corresponding to this type of moment may provide increased output.

When a force (corresponding to Fy2) is applied to the working implement coupling mechanism of the triangular frames 130 in a direction along the axles, this force is not conducted directly to the rear axle case 18. This is because the rear axle case 18 is displaceable within a predetermined range in the direction along the axles relative to the triangular frames 130 acting as the rear connecting mechanism 12.

(b-3) Absorption of Distorting Energy (General)

Figure 8:
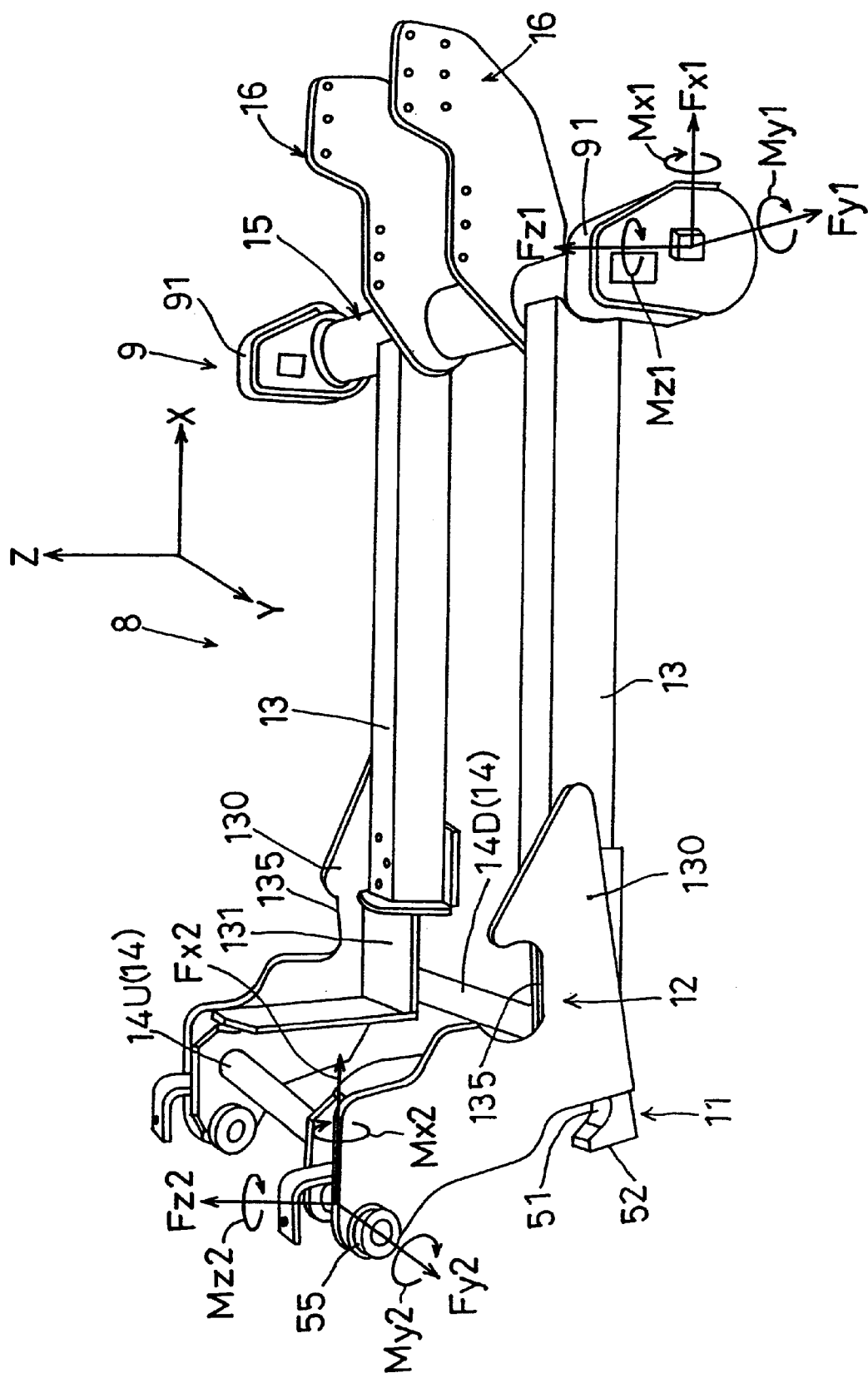
FIG. 8 is a perspective view depicting forces and moments applied to the reinforcing frame structure.

It is relatively easy to explain how the reinforcing frame structure 8 absorbs strain energy due to components of force and bending moment conducted in particular directions from the front loader 6 and backhoe 7 as shown in FIG. 8. In actual operations, more complex forces are considered to act on the mast mounting brackets 91 and triangular frames 130.

However, whatever force acting on the mast mounting brackets 91 can be differentiated into components of force (Fx; Fy; Fz) acting in three directions (x, y and z directions: here, as shown in FIG. 8, x direction corresponding to a tractor moving direction, y direction being along the axles, and z direction being upward) and moments about the three axes (moment Mx about x axis, moment My about y axis, and moment Mz about z axis). A certain proportion of each of these components of force (Fx1, Fy2 and Fz3) is absorbed by elastic bending deformation of the front cross bar 15. Consequently, these components of force are conducted in reduced quantities to the tractor body 5.

Specifically, Fx1 acts on the cross bar 15 as a bending force in a direction along x axis, whereby the cross bar 15 undergoes an elastic deformation along x axis. Fx1 also acts on the right and left frames (square pipes 13) as a tensile or compressive force, whereby the frames are elastically deformed along x axis. Fy1 acts on the cross bar 15 as a tensile or compressive force along y axis, whereby the cross bar 15 undergoes an elastic deformation along y axis. Fy1 also acts on the right and left frames (square pipes 13) along y axis whereby the frames are elastically deformed along y axis. Similarly, Fz1 deforms the cross bar 15 along z axis, and deforms the right and left frames (square pipes 13) along z axis.

The components of bending moment (Mx1, My2 and Mz3) are also absorbed in certain proportions by torsional deformation of the front cross bar 15 and torsional deformation about y axis of the mast mounting brackets 91 themselves. Consequently, these components of moment are conducted in reduced magnitude to the tractor body 5.

Specifically, Mx1 acts on the cross bar 15 as a bending force in a direction along z axis, whereby the cross bar 15 undergoes an elastic deformation along z axis. The right and left frames (square pipes 13) act as a resistance to the elastic deformation of the cross bar 15. Thus, part of the strain energy due to moment Mx1 is absorbed by the cross bar 15 and square pipes 13. My1 acts on the cross bar 15 as a torsional torque about y axis, whereby the cross bar 15 undergoes a torsional deformation about y axis. The square pipes 13 act as a resistance to the torsional deformation of the cross bar 15. Thus, part of the strain energy due to moment My1 is absorbed by the cross bar 15 and right and left frames (square pipes) 13. Similarly, Mz1 deforms the cross bar 15 along x axis, and the right and left frames (square pipes 13) act as a resistance to this deformation. Thus, part of the strain energy due to moment Mz1 is absorbed by the cross bar 15 and right and left frames (square pipes) 13.

Note: The directions of arrows relating to Fx, Fy, Fz, Mx, My and Mz are illustrated in aid of the description. A person skilled in the art will appreciate that actual forces may have components thereof acting in directions opposite to the illustrated directions.

A similar analysis may be made of components of force (Fx2, Fy2 and Fz2) acting on the upper coupling pins 55 and lower couplings 52 of the working implement coupling mechanism 11. For example, Fx2 acts on the ends of the right and left frames (square pipes 13) as a bending stress, whereby the square pipes 13 are elastically deformed. Consequently, the reinforcing frame structure 8 absorbs a proportion of strain energy corresponding to an amount of elastic deformation. Similarly, Fy2 acts as torsional moment on the rear ends of the square pipes 13, and a proportion of this force is absorbed by torsional deformation of the square pipes 13. Fz2 elastically deforms the square pipes 13 which absorbs a certain proportion of strain energy.

The components of bending moment (Mx2, My2 and Mz2) are also absorbed in certain proportions by the reinforcing frame structure 8 through elastic deformation of the triangular frames 130, rear cross bars 14U and 14D and square pipes 13. For example, a reaction or moment due to My2 applied to the tractor body 5 is considered negligible in substance, compared with other components of moment, since the coupling 56 of the backhoe 7 merely holds the upper coupling pins 55 from above and below to produce a braking force based on sliding resistance.

A large part of the component of moment Mz2 is absorbed by bending of the rear cross bars 14U and 14D and deformation of the triangular frames 130. My2 is absorbed in a certain proportion by elastic deformation of the triangular frames 130 and bending of the square pipes 13. These components of bending moment have further reduced influences on the tractor body 5 since the rear axle case 18 is rotatable and axially displaceable within a predetermined range relative to the triangular frames 130.

A similar analysis may be made of components of force in the three directions and components of moment about the three axes acting on the lower couplings 52. This analysis is considered obvious to persons skilled in the art, and will not particularly be described.

(c-1) Reinforcing Frame Structure 8B

Figure 11:
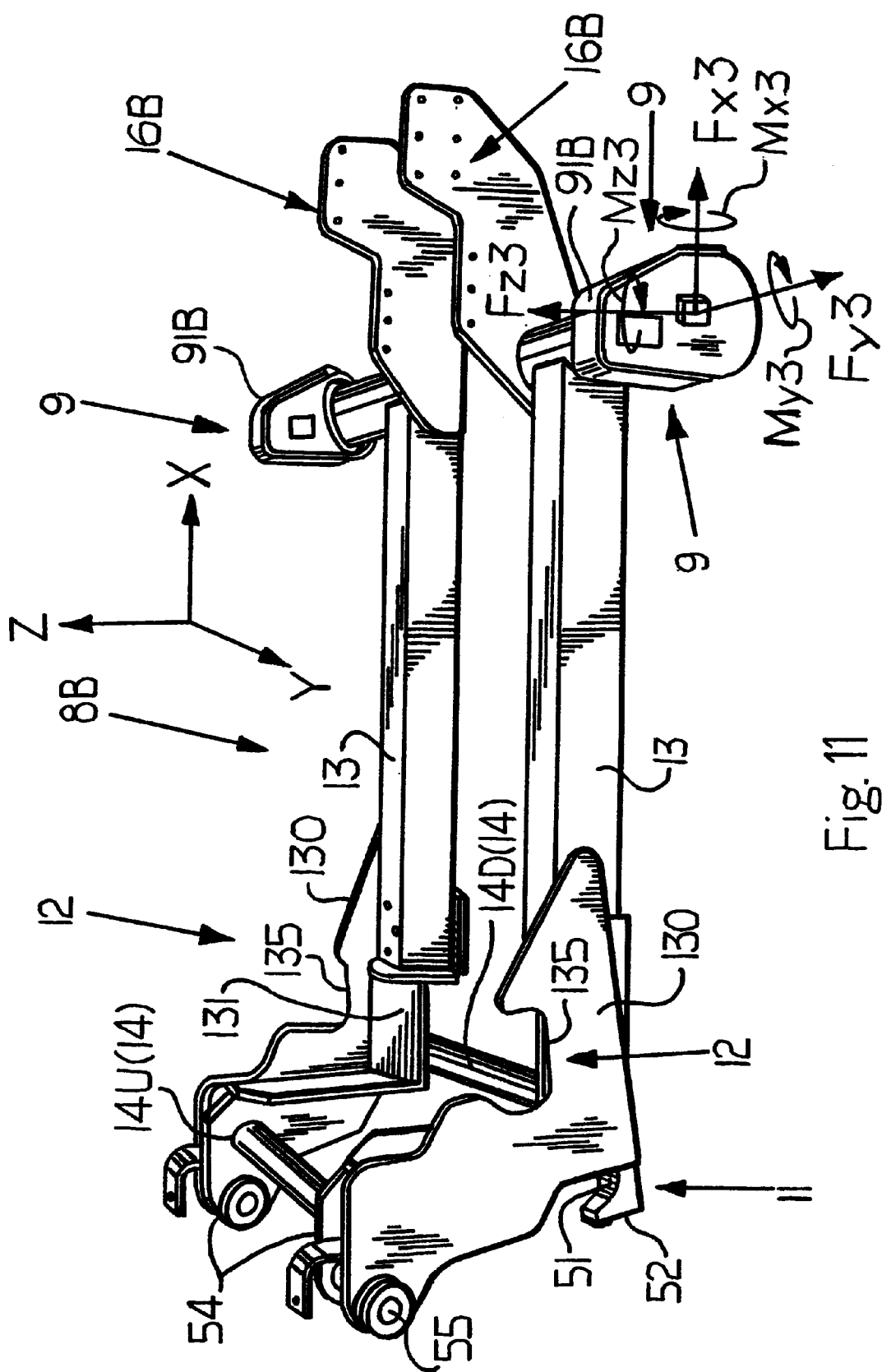
FIG. 11 is a perspective view of a modified reinforcing frame structure.

The reinforcing frame structure 8 described hereinbefore has a complete loop configuration including the right and left square pipes 13, rear cross bars 14 and front cross bar 15. As shown in FIG. 11, the front cross bar may be omitted. This structure may includes connecting arms 16B extending from the forward ends of the right and left square pipes 13 to act as the front connecting mechanism, and mast mounting brackets 91B formed on extensions disposed laterally outwardly of the forward ends of the square pipes 13.

Compared with the reinforcing frame structure 8 described hereinbefore, this reinforcing frame structure 8B absorbs less strain energy due to forces conducted from the front loader 6 for the absence of the front cross bar 15. Thus, increased components of force or moment are expected to be conducted to the tractor body 5. However, the conduction may be lessened by increasing rigidity of the right and left square pipes 13.

Specifically, Fx3 acts on the square pipes 13 as a compressive or tensile force, whereby the square pipes 13 are axially deformable by a certain amount. This elastic deformation absorbs part of the strain energy due to Fx3, so that this component of force is not conducted directly to the tractor body 5. Fy3 acts on the square pipes 13 in directions to bend the square pipes 13 outward or inward transversely thereof. Deformation of the square pipes 13 and elastic deformation of the connecting arms, 16B absorbs part of the strain energy due to Fy3, so that this component of force is not conducted directly to the tractor body 5.

Regarding Fz3, a large part of the strain energy due to Fz3 is absorbed mainly by elastic deformation of the rear wheels 22.

Regarding component of moment Mx3, a large part of the strain energy due to this moment is absorbed by elastic deformation along the axles of the connecting arms 16.

My3 is conducted to the connecting arms 16B with relatively little elastic deformation of the components. Though little elastic deformation is expected of the connecting arms 16B occurring with a moment about this axis, the strain energy due to the component of bending moment My3 acting on the front axle frame 4 is in substance absorbed mainly by elastic deformation of the tires of front wheels 21. The burden actually working on the tractor body 5 is negligible.

With respect to Mz3, the connecting arms 16B are deformable along the axles. Its deformation, ie. absorption by the 1reinforcing frame structure 8B of the strain energy due to the above moment, reduces the moment to be conducted to the tractor body 5.

The rear coupling mechanism 11 is substantially the same as in the reinforcing frame structure 8. The components of force and moment from the backhoe 7 are conducted in reduced quantities to the tractor body 5 as described hereinbefore.

(c-2) Reinforcing Frame Structure 8C

Figure 12:
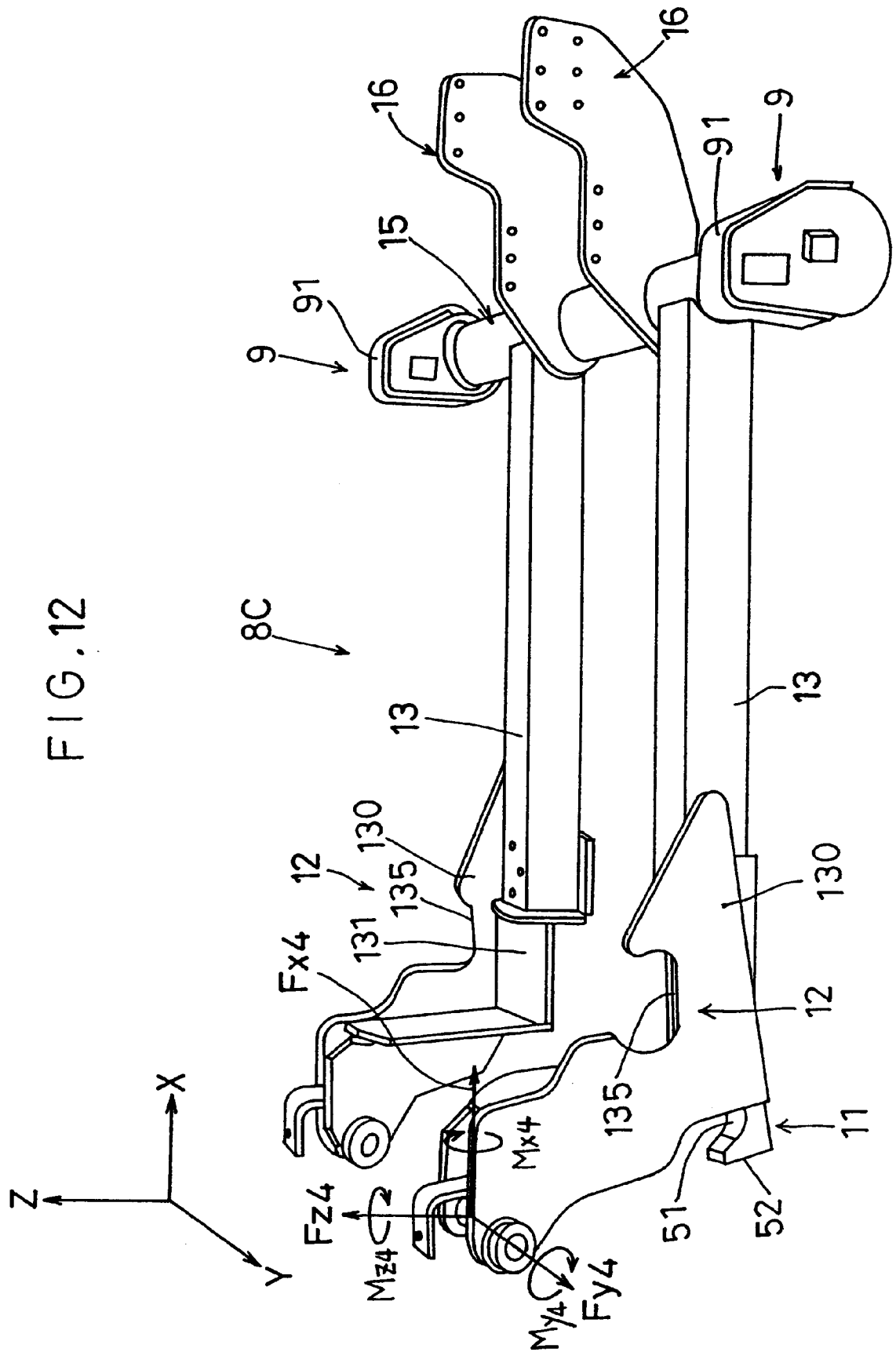
FIG. 12 is a perspective view of another modified reinforcing frame structure.

As shown in FIG. 12, the reinforcing frame structure may be modified to exclude the rear cross bars 14 therefrom. In this case, components of force Fx4 and Fz4 are conducted in reduced absolute values to the tractor body 5 by elastic deformation of the square pipes 13 in z direction within the xz planes of the triangular frames. However, the component of force Fy4 cannot be absorbed because of the absence of rear cross bars 14 which would undergo compressive and tensile deformations. Thus, this reinforcing frame structure 8C is not expected to absorb the strain energy due to Fy4. However, since the strain energy due to components of force Fx and Fy is absorbable, the forces to be borne by the tractor body 5 are diminished when taken in their absolute value $$(Fx^2+Fy^2+Fz^2)^{\cdot\cdot(\frac{1}{2})}.$$

Similarly, the component of bending moment Mx4 is considered to cause a deformation along the axles of the square pipes 13. This component of moment may be diminished by the rear cross bars before being conducted to the tractor body 5. Since this embodiment includes no rear cross bars, this component of moment must be conducted to the tractor body 5. However, taken as a sum total of moments as described in relation to the above component of force, the strain energy due to the moment to be borne by the tractor body 5 is diminished since components My and Mz are absorbable.

Thus, the particular components of force and of moment are conducted directly to the tractor body 5 where the rear cross bars 14 are omitted. However, since the other components of force and of moment are effectively absorbable, the reinforcing frame structure in this embodiment, on the whole, is considered to be fully contributive to a power increase of the working implement.

(c-3) Reinforcing Frame Structure 8D

Figure 13:
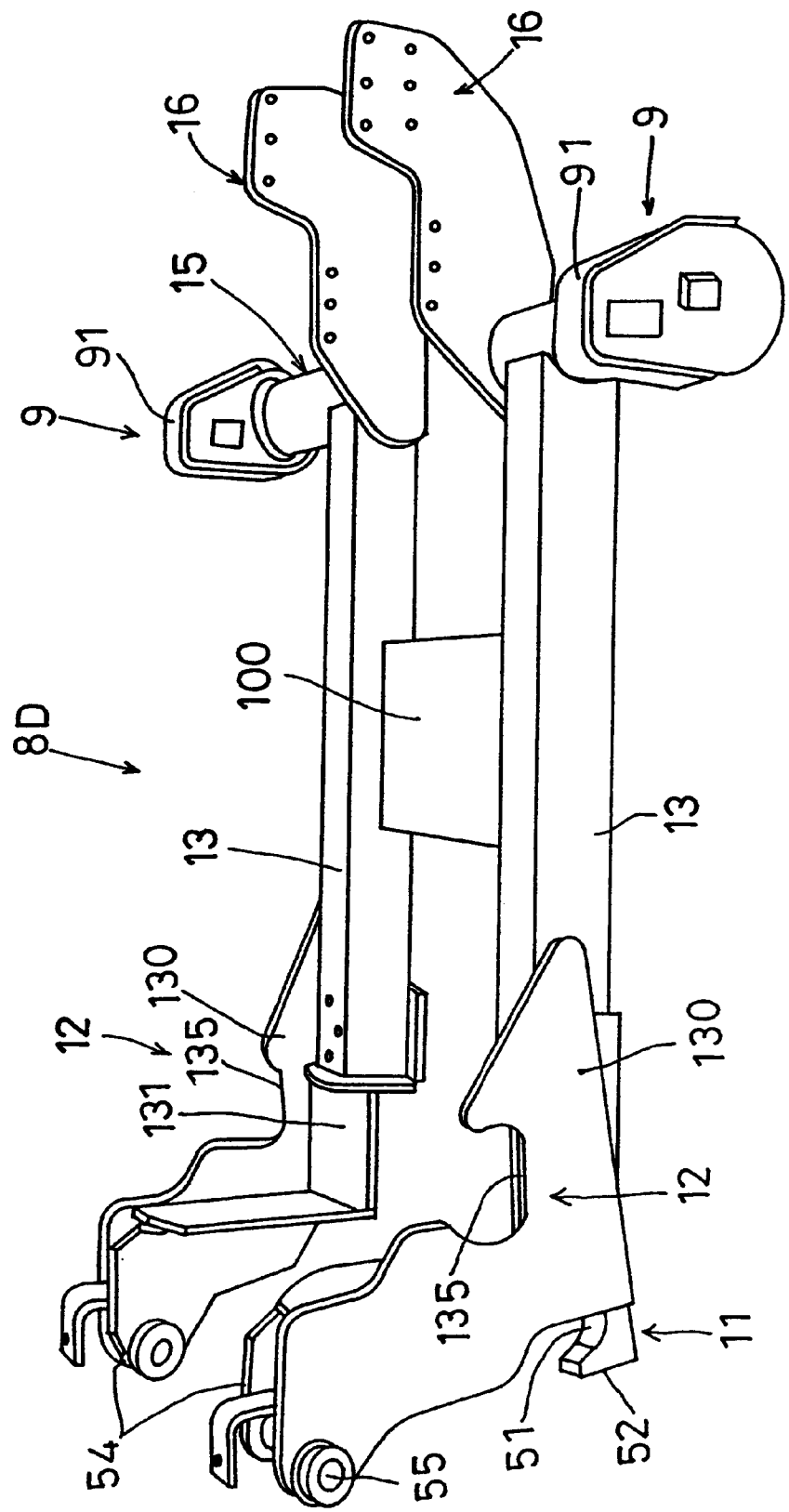
FIG. 13 is a perspective view of a further modified reinforcing frame structure.

As shown in FIG. 13, a reinforcing frame structure 8D includes a cross bar 100 interconnecting the right and left frames 13 in longitudinally intermediate positions thereof.

(d-1)

Figure 9:
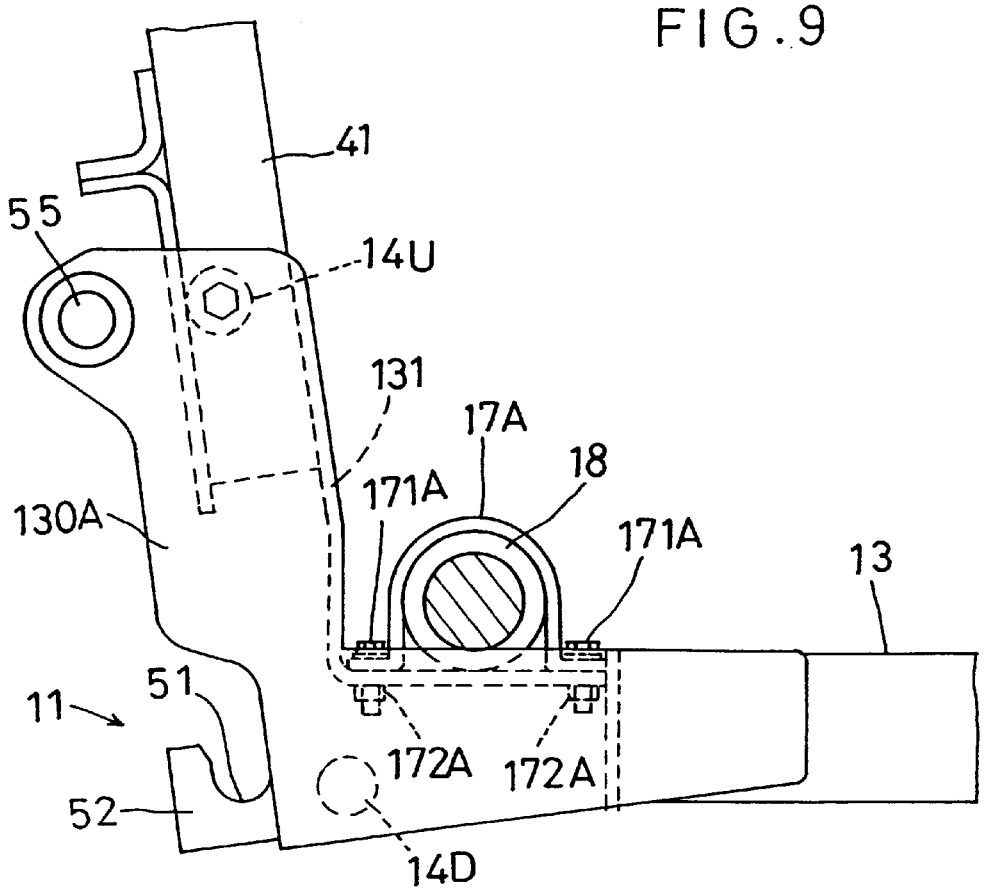
FIG. 9 is a perspective view of a modified holder of a rear connecting mechanism of the reinforcing frame structure.

The rear connecting mechanism 12 may have the recesses 135 eliminated from the triangular frames 130. As shown in FIG. 9, L-shaped frames 130A may be provided instead of the triangular frames 130, with inverted U-shape holders 17A opening downward.

(d-2)

Figure 10:
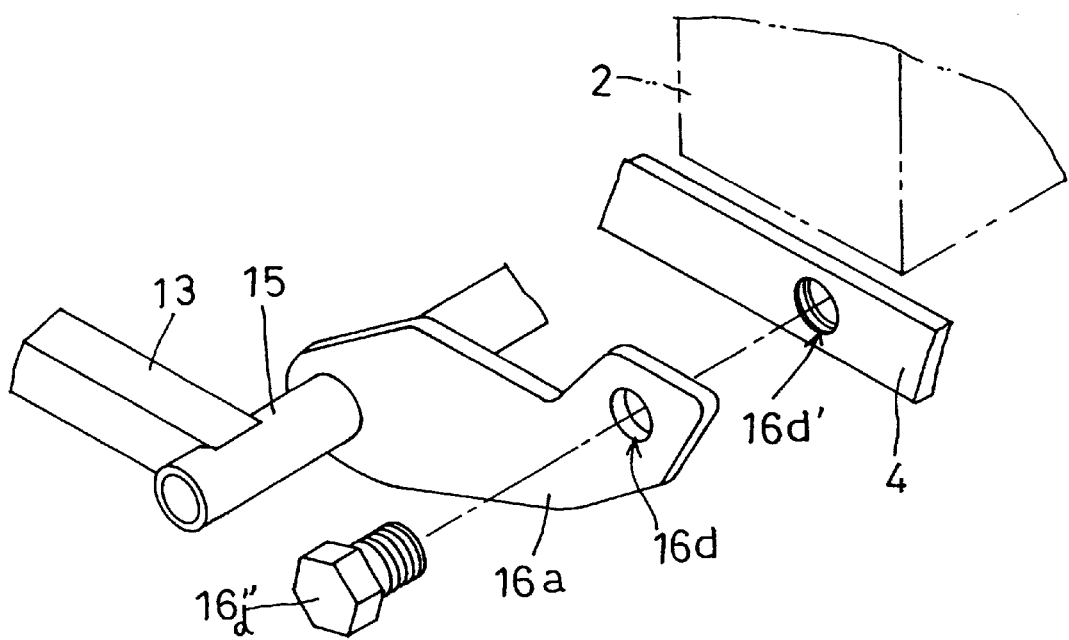
FIG. 10 is a perspective view of a modified front connecting mechanism of the reinforcing frame structure.

In the foregoing embodiments, the body connector 16a of connecting arms 16 is simply in the form of a plurality of bolt bores. As shown in FIG. 10, the body connector may be modified to include a circular opening 16d formed in each connecting arm 16, with a corresponding, threaded opening 16d' formed in the front axle frame 4. These openings 16d and 16d' are placed in register and connected with a cylindrical screw 16d". With this construction, the connecting arms 16 are pivotable about y axis relative to the tractor body 5. Thus, the reinforcing frame structure 8 is connected to the tractor body 5 with an increased degree of freedom.

(d-3)

The front cross bar 15 and rear cross bars 14 have a circular section, which is not limitative. These cross bars may have a square section or an elliptic section.

(d-4)

In the foregoing embodiments, a pair of connecting arms 16 extend from the front cross bar 15. The connecting arms 16 may have a varied shape and extend from adjacent the forward ends of the right and left frames.

(d-5)

The foregoing embodiments have been described in relation to absorption of strain energy due to the elastic deformation of the frames. This is based on Castigliano's method set out below:

$$\Delta = dU/dQ$$

When a body is elastically deflected by any combination of loads, the deflection at any point and in any direction is equal to the partial derivative of strain energy (computed with all loads acting) with respect to load at that point and acting in that direction.

(e)

With a reinforcing frame structure attached to an ordinary agricultural tractor, a front loader may be connected to the front of the tractor and a working implement such as a backhoe to the rear thereof to carry out varied operations. Since the reinforcing frame structure absorbs part of the strain energy resulting from an operation of the front loader, the load acting on the tractor body is diminished. This feature enables an increase in the output of operation by the front loader or backhoe without increasing the rigidity of the tractor body.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A reinforcing frame structure for coupling a front loader to a front region of a tractor body and a working implement to a rear region thereof, the tractor body having an engine and a transmission case interconnected and arranged longitudinally thereof, with a front axle frame extending from the engine, said reinforcing frame structure comprising:

right and left frames arrangeable laterally of the tractor body in a position extending longitudinally thereof, said right and left frames having a rear connecting mechanism including right and left members integrally forming rearward positions of said right and left frames respectively, each of said right and left members includes a holding mechanism for holding opposite ends of a rear axle case, whereby said reinforcing frame structure is attachable to and detachable from the tractor from below as an integral assembled unit;

a lower rear cross bar located near said holding mechanism for rigidly interconnecting said right and left frames in rearward positions thereof;

a working implement coupling mechanism connected to said right and left frames for coupling the working implement coupling mechanism for coupling the working implement;

a loader coupling mechanism coupled to said right and left frames for coupling the front loader; and a front connecting mechanism coupled to said right and left frames, said front connecting mechanism for connecting forward regions of said right and left frames to the tractor body.

2. A reinforcing frame structure as defined in claim 1, wherein said holding mechanism includes holders for overlying opposite end regions of the rear axle case, and fixing elements fixing said holders to said right and left frames.

3. A reinforcing frame structure as defined in claim 1, wherein said holding mechanism includes inverted attaching, from above, opposite end regions of the rear axle case to said rear connecting mechanism, and fixing elements fixing said holders to said right and left frames.

4. A reinforcing frame structure as defined in claim 2, wherein said rear connecting mechanism is selectively spaceable from the rear axle case which allows the rear axle case to move within a predetermined range transversely of said tractor body.

5. A reinforcing frame structure as defined in claim 2, wherein said working implement coupling mechanism includes a pair of first coupling members provided at rear end regions of said rear connecting mechanism, and a pair of second coupling members arranged above said first coupling members, said first coupling members being brackets having U-shaped openings, said second coupling members being coupling pins adapted to extend transverse to the tractor body.

6. A reinforcing frame structure as defined in claim 5, wherein each of said right and left members include a triangular frame.

7. A reinforcing frame structure as defined in claim 6, wherein said first cross bar extends between said triangular frames of said rear connecting mechanism.

8. A reinforcing frame structure as defined in claim 1, further comprising a second cross bar interconnecting said right and left frames in positions adjacent said forward regions thereof.

9. A reinforcing frame structure as defined in claim 8, wherein said loader coupling mechanism is coupled to said right and left frames through said second cross bar and includes a pair of mast mounting brackets formed at a first end and a second end of said second cross bar disposed laterally outwardly of said right and left frames.

10. A reinforcing frame structure as defined in claim 9, wherein said front connecting mechanism includes a pair of connecting arms and wherein said second cross bar supports said pair of connecting arms which are connectable to the tractor body, wherein a first amount of elastic deformation of said connecting arms occurring under a first load acting on ends of said connecting arms laterally of the tractor body is greater than twice a second amount of elastic deformation of said connecting arms occurring under a second load acting on said ends of said connecting arms within an imaginary plane parallel to a section of said second cross bar, where a magnitude of said first load is equal to a magnitude of said second load.

11. A reinforcing frame structure as defined in claim 9, wherein said front connecting mechanism includes a pair of connecting arms and wherein said second cross bar supports said pair of connecting arms which are connectable to the tractor body, each of said connecting arms having a sectional shape wherein a section modulus of said connecting arm with respect to a vertical axis extending through a section center of said connecting arm is less than one half of a section modulus of said connecting arm with respect to a horizontal axis extending through the section center of said connecting arm.

12. A reinforcing frame structure as defined in claim 1 wherein said rear connecting mechanism includes upward openings to be connectable to a rear axle case of the tractor body from below.

13. A reinforcing frame structure as defined in claim 1 wherein said front connecting mechanism includes a pair of connecting arms attached to said second cross bar.

14. A reinforcing frame structure as defined in claim 13 wherein each said connecting arm is elastically deformable to a greater extent in response to force applied transversely to the tractor body than to forces applied in a gravitational direction.

15. A reinforcing frame structure as defined in claim 1, wherein said lower rear cross member is located rearwardly of an axis of a rear axle, when said rear axle case is held by said holding mechanism.

16. A reinforcing frame structure as defined in claim 15, wherein said lower rear cross member is located below said axis of a rear axle when said rear axle case is held by said holding mechanism.

17. A reinforcing frame structure as defined in claim 1, further comprising an upper rear cross bar separate from said lower rear cross bar, said upper rear cross bar connecting said first and second members at upper regions thereof.

18. A reinforcing frame structure for coupling a front loader to a front region of a tractor body and a working implement to a rear region thereof, the tractor body having an engine and a transmission case interconnected and arranged longitudinally thereof, with a front axle frame extending from the engine, said reinforcing frame structure comprising:

right and left frames arrangeable laterally of the tractor body in a position extending longitudinally thereof, said right and left frames having a rear connecting mechanism including right and left members integrally forming rearward positions of said right and left frames respectively;

a lower rear cross bar rigidly interconnecting said right and left frames in rearward positions thereof;

a working implement coupling mechanism connected to said right and left frames for coupling the working implement, said working implement coupling mechanism having an upper coupling and a lower coupling;

a loader coupling mechanism coupled to said right and left frames for coupling the front loader; and a front connecting mechanism coupled to said right and left frames, said front connecting mechanism for connecting forward regions of said right and left frames to the tractor body, wherein each of said right and left members includes a holding mechanism holding opposite ends of a rear axle case, said holding mechanism includes an upward opening whereby said reinforcing frame structure is attachable to and detachable from the tractor from below as an integral assembled unit and wherein said lower rear cross bar is located rearwardly of and below an axis of said rear axle when said rear axle case is held by said holding mechanism.

19. A reinforcing frame structure as defined in claim 2 wherein each said holder further comprises a ball bearing to provide an increased freedom of relative displacement of the rear axle case with respect to said reinforcing frame structure.

* * * * *

UNITED STATES PATENT AND TRADEMARK OFFICE
CERTIFICATE OF CORRECTION

PATENT NO.   : 6,056,502
DATED        : June 20, 2000
INVENTOR(S)  : Toshihiko Takemura et al.

It is certified that error appears in the above-identified patent and that said Letters Patent is hereby corrected as shown below:

Column 7,
Line 61 "$Z^2 \rangle Z1xN$" should read --$Z2 \rangle Z1xN$--.

Column 10
Line 55 "couplings D2" should read --couplings 52--.

Claim 3, column 15,
Line 47, after "inverted" insert --U-shaped holders for--.

Claim 19, column 18,
Lines 13-17, delete claim 19 and insert: --A reinforcing frame structure as defined in claim 18 further comprising an upper rear cross bar separate from said lower rear cross bar, said upper rear cross bar connecting said first and second members in a region of said upper coupling--.

Signed and Sealed this

Seventeenth Day of July, 2001

*Attest:*

NICHOLAS P. GODICI
*Attesting Officer*    *Acting Director of the United States Patent and Trademark Office*